UNITED STATES PATENT OFFICE.

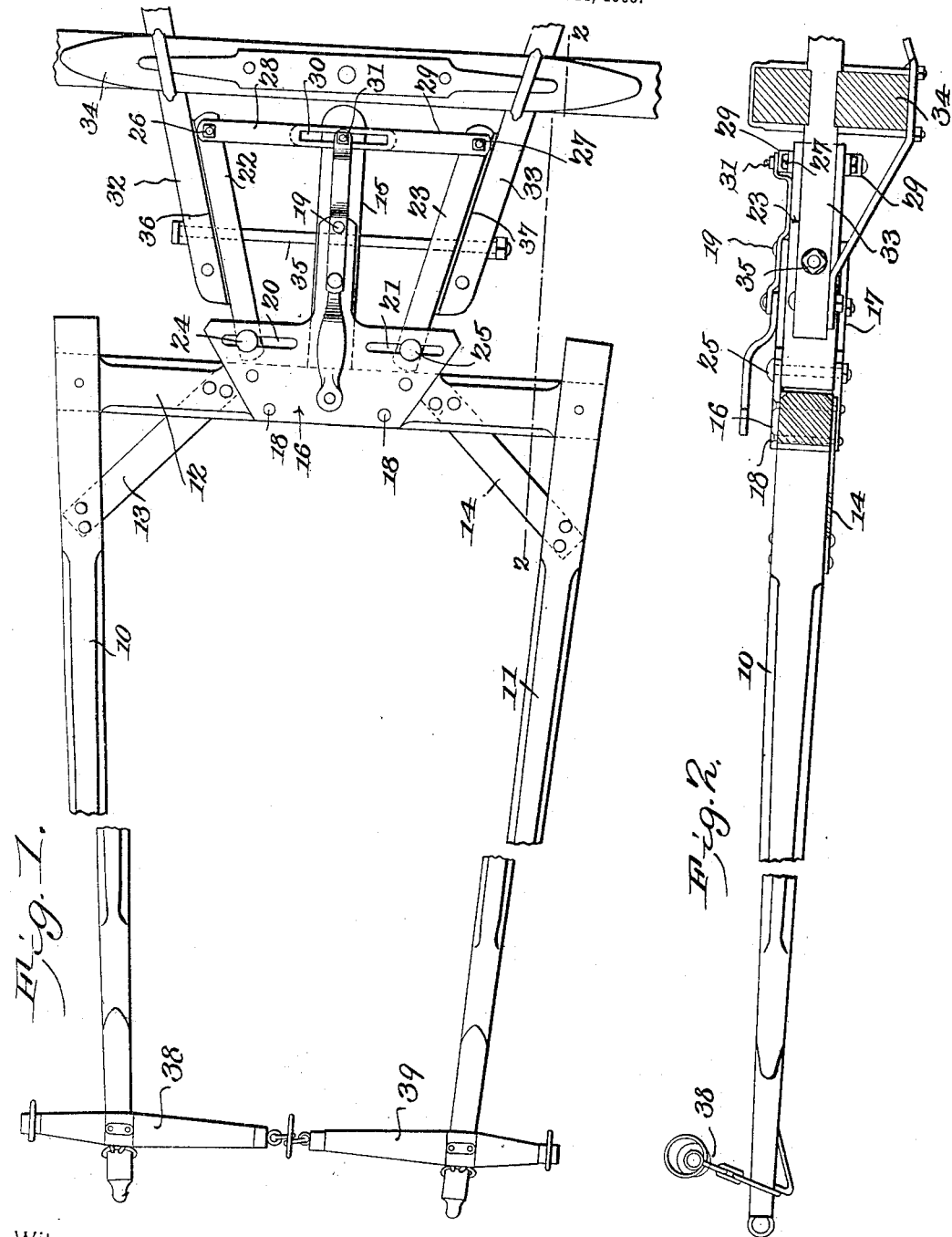

CHARLES J. BOLTE, OF COLUMBUS, WISCONSIN.

VEHICLE DRAFT APPLIANCE.

No. 818,997.   Specification of Letters Patent.   Patented April 24, 1906.

Application filed November 14, 1905. Serial No. 287,307.

*To all whom it may concern:*

Be it known that I, CHARLES J. BOLTE, a citizen of the United States, residing at Columbus, in the county of Columbia and State of Wisconsin, have invented a new and useful Vehicle Draft Appliance, of which the following is a specification.

This invention relates to the draft appliances of vehicles, and has for its object to improve the construction and increase the efficiency and adaptability of devices of this character.

With these and other objects in view, which will appear as the nature of the invention is better understood, the invention consists in certain novel features of construction, as hereafter fully described and claimed.

In the accompanying drawings, forming a part of this specification, and in which corresponding parts are denoted by like designating characters, is illustrated the preferred form of the embodiment of the invention capable of carrying the same into practical operation, it being understood that various changes in the form, proportion, and minor details of construction may be resorted to without departing from the principle or sacrificing any of the advantages of this invention within the scope of the appended claims.

Figure 1 is a plan view of the improved device applied. Fig. 2 is a sectional view on the line 2 2 of Fig. 1.

The improved device may be adapted without material structural changes to a single draft-tongue employed for two horses or to double or spaced tongues employed for three horses and for the purpose of illustration is shown applied to a draft appliance embracing the spaced tongues for a three-horse team, the tongues being represented at 10 11 and connected at the rear ends by a transverse bar 12 and with diagonal connecting-braces 13 14.

Extending rearwardly of the bar 12 is an arm 15, and extending over the bar and arm are spaced plates 16 17, riveted or bolted at 18 19 to the bar and arm, forming a rigid coupling means for uniting these parts. The plates 16 17 are provided with slots 20 21, extending laterally of the arm 15 and parallel to the transverse bar 12. Disposed at one end between the plates 16 17 are bars 22 23, and adjustably coupled to the plates by clamp-bolts 24 25, extending through the slots 20 21 and likewise through the bars 22 23, the bars 22 23 being thus disposed in position for adjustment toward and away from the arm 15, but also free to swing at the free ends upon the clamp-bolts 24 25. Pivoted at 26 27 to the free ends of the bars 22 23 are links 28 29, extending inwardly and overlapping above and below the rear end of the arm 15. The links 28 29 are slotted at their inner ends, as at 30, and supplied with a clamp-bolt 31, extending through the slots and likewise through the arm, so that the rear ends of the bars 22 23 may be adjusted farther from or nearer to the arm and locked in any desired adjusted position.

The bars 22 23 are designed to fit between the hounds 32 33 of the forward axle 34 and coupled movably thereto by the usual pivot-bolt 35, extending through the hounds and likewise through the bars 22 23 and arm 15. The bars 22 23 are adjustable laterally to enable the device to be readily adapted to different forms and sizes of hounds, as will be obvious. The bars 22 23 are provided with metal wear-strips 36 37, as shown.

Neck-yokes 38 39 are movably coupled to the forward ends of the tongues 10 11.

Having thus described the invention, what is claimed is—

1. As a new article, a draft appliance for vehicles having bars movably disposed at opposite sides of the rear portion, and means for adjusting said bars relative to said appliance to adapt the bars for bearing between the axle-hounds of the vehicle.

2. As a new article, a draft appliance for vehicles having an arm extending rearwardly thereof and with bars movably disposed at opposite sides of the arm, and means for adjusting said bars relative to said arm to adapt the bars for bearing between the axle-hounds of the vehicle.

3. As a new article, a draft appliance for vehicles having bars movably disposed at opposite sides of the rear portion, means for adjusting said bars relative to said appliance to adapt the bars for bearing between the axle-hounds of the vehicle, and a pivot-bolt extending transversely through said adjustable bars and the side members of the axle-hounds.

4. As a new article, a draft appliance for vehicles having an arm extending rearwardly thereof and with bars movably disposed at opposite sides of the arm, means for adjusting said bars relative to said arm to adapt the bars for bearing between the axle-hounds of the vehicle, and a pivot-bolt extending transversely through said adjustable bars and arm and the side members of the axle-hounds.

5. As a new article, a draft appliance for vehicles having an arm extending rearwardly thereof, spaced plates connecting said draft appliance and arm and provided with slots extending laterally of the arm, bars disposed at one end between said plates and coupled adjustably thereto by clamp-bolts extending through the slots therein, slotted links pivoted at one end to the free ends of said bars and overlapping at said arm, and a clamp-bolt operating through said arm and the slots in said links.

6. A device of the class described comprising spaced tongues connected at the rear by a transverse bar, an arm extending rearwardly of said bar, spaced bars movably disposed at opposite sides of said arm, and means for adjusting said bars relative to said arm for adapting them to the axle-hounds of a vehicle.

7. A device of the class described comprising spaced tongues connected at the rear by a transverse bar, an arm extending rearwardly of said transverse bar, spaced plates connecting said transverse bar and arm and provided with slots extending laterally of the arm, bars disposed at one end between said plates and coupled adjustably thereto by clamp-bolts extending through the slots therein, slotted links pivoted at one end to the free ends of said bars and overlapping at said arm, and a clamp-bolt operating through said arm and the slots in said links.

In testimony that I claim the foregoing as my own I have hereto affixed my signature in the presence of two witnesses.

CHARLES J. BOLTE.

Witnesses:
E. E. BROSSARD,
JOSEPHINE G. AUSTIN.